United States Patent
Fang et al.

(10) Patent No.: US 9,556,076 B2
(45) Date of Patent: Jan. 31, 2017

(54) SALT RESISTANT CEMENT

(75) Inventors: Congqi Fang, Shanghai (CN); Junfeng Zhu, Shanghai (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 5 days.

(21) Appl. No.: 14/355,826

(22) PCT Filed: Nov. 2, 2011

(86) PCT No.: PCT/CN2011/081675
§ 371 (c)(1),
(2), (4) Date: May 1, 2014

(87) PCT Pub. No.: WO2013/063771
PCT Pub. Date: May 10, 2013

(65) Prior Publication Data
US 2015/0158774 A1    Jun. 11, 2015

(51) Int. Cl.
*C04B 28/00* (2006.01)
*C04B 41/50* (2006.01)
(Continued)

(52) U.S. Cl.
CPC ............. *C04B 41/5024* (2013.01); *C04B 7/52* (2013.01); *C04B 28/02* (2013.01); *C04B 41/009* (2013.01);
(Continued)

(58) Field of Classification Search
CPC ...... C04B 41/00; C04B 41/45; C04B 41/4505; C04B 41/4539; C04B 41/4578; C04B 41/61; C04B 41/62; C04B 41/63; C04B 41/65; C04B 41/80; C04B 41/81; C04B 41/82; C04B 41/83; C04B 41/85; C09D 1/00; C09D 5/08; C09D 5/082; C09D 5/084; C09D 5/16; C09D 5/1606; C09D 5/1618; C09D 5/1637; C09D 5/24; C09D 7/00; C09D 7/12; C09D 7/1216; C09D 7/1258; C09D 7/1283; C09D 7/1291
(Continued)

(56) References Cited

U.S. PATENT DOCUMENTS

| 4,515,861 A | 5/1985 | Arup |
| 5,989,334 A | 11/1999 | Dry |
| 7,670,426 B2 | 3/2010 | Gray |

FOREIGN PATENT DOCUMENTS

| CN | 2760028 Y | 2/2006 |
| CN | 101054278 A | 10/2007 |

(Continued)

OTHER PUBLICATIONS

Gui-Jia, L., et al., "Research Progress in Cement Based Piezoelectric Composites," Materials Review, Issue 23, pp. 52-55 (2009).
(Continued)

*Primary Examiner* — William Phillip Fletcher, III
(74) *Attorney, Agent, or Firm* — Maschoff Brennan (57) ABSTRACT

Disclosed herein are corrosion-resistant composites. In particular, the composites can include a piezoelectric material embedded within a binding medium that can impede or inhibit the corrosive effects caused by salts and acids. Also disclosed herein are methods of making the composites and methods of protecting a concrete or concrete-related substrate from corrosion.

24 Claims, 6 Drawing Sheets

(51) Int. Cl.
| | |
|---|---|
| C04B 41/45 | (2006.01) |
| C04B 41/63 | (2006.01) |
| C09D 7/12 | (2006.01) |
| C09D 5/08 | (2006.01) |
| C04B 28/02 | (2006.01) |
| C04B 7/52 | (2006.01) |
| C04B 41/00 | (2006.01) |
| C04B 41/65 | (2006.01) |
| C04B 111/00 | (2006.01) |
| C04B 111/20 | (2006.01) |
| C04B 111/23 | (2006.01) |
| C04B 111/24 | (2006.01) |

(52) U.S. Cl.
CPC ....... *C04B 41/4505* (2013.01); *C04B 41/5001* (2013.01); *C04B 41/5079* (2013.01); *C04B 41/63* (2013.01); *C04B 41/65* (2013.01); *C09D 5/084* (2013.01); *C09D 7/1216* (2013.01); *C04B 2111/00482* (2013.01); *C04B 2111/2015* (2013.01); *C04B 2111/23* (2013.01); *C04B 2111/24* (2013.01)

(58) Field of Classification Search
USPC ........................................ 106/14.05; 427/403
See application file for complete search history.

(56) References Cited

FOREIGN PATENT DOCUMENTS

| CN | 101054279 A | | 10/2007 |
|---|---|---|---|
| CN | 101333348 A | | 12/2008 |
| CN | 101402813 A | * | 4/2009 |
| CN | 101531489 A | * | 9/2009 |
| CN | 101531490 A | | 9/2009 |
| CN | 101538144 A | | 9/2009 |
| CN | 102757214 A | * | 10/2012 |

OTHER PUBLICATIONS

Huiling, C., et al., "Absorption and Degradation of Organic Dyestuff Like Methylene Blue by Tourmaline," Guangdong Chemical Industry, vol. 34, No. 1, pp. 30-34 (2007).
Kai-Yong, Z., et al., "Present Situation of Research and Development of Tourmaline and Its Application Future at Home and Abroad," Mining and Metallurgy, vol. 13, No. 1, pp. 97-100 (2004).
Lan-Ying, X., et al., "Reduction of Harmful Components of Cigarette Smoke by Modified Wrap Paper with Tourmaline," Paper and Paper Making, Feb. 2009.
Li, Z., et al., "Cement-Based 0-3 Piezoelectric Composites," Journal of the American Ceramic Society, vol. 85, Issue 2, pp. 305-313 (2002).
Su-Ping, C., et al., "Graphite—Preparation of Cement-Based Composites and Performance thereof," Journal of the Chinese Ceramic Society (2007) (1).
Xingang, Z., et al., "Principle and Application of Chloride Extraction from Concrete," Industrial Construction (2002) (32).
Xue-Li, W., et al., "Diffusion Rate of Chloride Ions in Concrete," Concrete, 1996 (6).
Yamaguchi, S., "Electron Diffraction Study of a Pyroelectric Tourmalaine Crystal," Journal of Applied Physics, vol. 35, Issue 5, pp. 1654-1655 (1964).
Zhi-Jiang, J., "Tourmaline Self-Polarization and Application Foundation Research," China Building Materials Academy (2003) (1).
International Search Report for International Application No. PCT/CN2011/081675 mailed on Aug. 9, 2012.

* cited by examiner

Removal of the external electric field

FIG. 4C

Formation of piezoelectric field under external force
Seawater pressure P

SALT RESISTANT CEMENT

CROSS-REFERENCE TO RELATED APPLICATION

The present application is the U.S. National Phase filing under 35 U.S.C. §371 of International Application No. PCT/CN2011/081675 entitled SALT RESISTANT CEMENT, filed on Nov. 2, 2011, designating the U.S. The content of this application is herein incorporated by reference in its entirety.

TECHNICAL FIELD

Field

The present disclosure relates generally to compositions and methods for protecting concrete from corrosion and enhancing concrete durability.

BACKGROUND

There has been a growing demand to improve the durability of concrete structures in the fields of civil engineering or construction. Concrete structures in coastal areas are particularly vulnerable to deterioration caused by salt damage. For example, chloride ions can neutralize a concrete material, which causes embrittlement and cracking. The chlorine ions may eventually reach internal reinforcing steel bars in the concrete structure and erode passive films on the reinforcing bars. This can cause the reinforcing bars to corrode and the concrete structure may ultimately fail. Various methods have been developed for protecting the reinforcing steel bars in concrete structure, including patching and setting up a moisture proof barrier. However, concrete patching can accelerate corrosion to adjacent reinforcing steel bars in the non-patching region, and the effectiveness of the protective layer can be reduced by friction and cracking. There is a need for effectively protecting concrete structures from corrosion caused by salts or acids.

SUMMARY

Some embodiments disclosed herein include a corrosion-resistant composite, comprising: a piezoelectric material; a binding medium; and a conductivity enhancer.

In some embodiments, the piezoelectric material is selected from the group consisting of a piezoelectric ceramic, a piezoelectric polymer, a piezoelectric crystal, a piezoelectric composite, and any combination thereof. In some embodiments, the piezoelectric material is selected from the group consisting of tourmaline, lead zirconate titanate (PZT), quartz, and any combination thereof. In some embodiments, the piezoelectric material comprises tourmaline particles. In some embodiments, the average size of the tourmaline particles is no more than $10^{-6}$ m. In some embodiments, the tourmaline particles are Elbaite particles.

In some embodiments, the composite has the piezoelectric material in a mass percent of about 50% to about 70%, based on the total mass of the composite. In some embodiments, the composite contains the piezoelectric material in a mass percent of about 65%, based on the total mass of the composite.

In some embodiments, the binding medium comprises cement. In some embodiments, the cement is hydraulic cement. In some embodiments, the composite contains the binding medium in a mass percent of about 20% to about 50%, based on the total mass of the composite. In some embodiments, the composite contains the binding medium in a mass percent of about 30%, based on the total mass of the composite.

In some embodiments, the conductivity enhancer comprises graphite particles. In some embodiments, the average size of the graphite particles is no more than $10^{-6}$ m. In some embodiments, the composite contains the conductivity enhancer in a mass percent of about 1% to about 10%, based on the total mass of the composite.

Some embodiments disclosed herein include a method of making a corrosion-resistant composite, the method comprising: combining a piezoelectric material, a binding medium, and a conductivity enhancer to form a mixture; polarizing the piezoelectric material embedded within the mixture; and curing the mixture to form a hardened composite.

In some embodiments, the piezoelectric material is selected from the group consisting of a piezoelectric ceramic, a piezoelectric crystal, a piezoelectric polymer, a piezoelectric composite, and any combination thereof.

In some embodiments, the piezoelectric material is selected from the group consisting of tourmaline, lead zirconate titanate (PZT), quartz, and any combination thereof. In some embodiments, the piezoelectric material composite comprises tourmaline particles. In some embodiments, the tourmaline particles are Elbaite particles. In some embodiments, the mixture contains the piezoelectric material in a mass percent of about 50% to about 70%, based on the total mass of the mixture.

In some embodiments, the conductivity enhancer comprises graphite particles.

In some embodiments, the mixture contains the binding medium in a mass percent of about 20% to about 50%, based on the total mass of the mixture.

In some embodiments, the combining comprises grinding the piezoelectric material, the binding medium, and/or the conductivity enhancer in a grinding medium. In some embodiments, the grinding medium contains at least about 99% ethanol by volume.

In some embodiments, the combining comprises passing the mixture through a 0.044-mm sieve.

In some embodiments, the polarizing comprises applying an external electric field to the mixture. In some embodiments, the voltage of the external electric field is about 100 V to about 250 V. In some embodiments, the external electric field is applied to the mixture for no more than about 30 minutes.

Some embodiments disclosed herein include a composite prepared according to any of the methods disclosed herein.

Some embodiments disclosed herein include a method of protecting a concrete or concrete-related substrate from corrosion, the method comprising: combining a piezoelectric material, a binding medium, and a conductivity enhancer to form a mixture; placing the mixture on the surface of the concrete or concrete-related substrate; polarizing the piezoelectric material embedded within the mixture; and curing the mixture to form a corrosion protective coating for the concrete or concrete-related substrate.

In some embodiments, the method further comprises applying external pressure on the protective coating to trigger polarization of the piezoelectric material embedded within the protective coating. In some embodiments, the piezoelectric material comprises tourmaline particles. In some embodiments, the binding medium comprises cement. In some embodiments, the conductivity enhancer comprises graphite.

In some embodiments, the concrete or concrete-related substrate is protected from corrosion caused by salt or acid. In some embodiments, the concrete or concrete-related substrate is protected from corrosion caused by ions selected from the group consisting of $Cl^-$, $SO_4^{2-}$, and $H^+$. In some embodiments, the concrete or concrete-related substrate is protected from corrosion caused by carbonic acid.

BRIEF DESCRIPTION OF THE DRAWINGS

FIGS. 4A-4E are schematic diagrams illustrating an embodiment of a method of protecting a concrete or concrete-related substrate from chloride ion permeation within the scope of the present disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Disclosed herein are composites that exhibit improved corrosion resistance. As described herein, the corrosion-resistant composites, in some embodiments, can include piezoelectric material, a binding medium, and a conductivity enhancer. In some embodiments, the piezoelectric material is dispersed within the binding medium and can impede or inhibit the corrosive effects caused by salts and/or acids. Also disclosed herein are methods of making the corrosion-resistant composites and methods of protecting a concrete or concrete-related substrate from corrosion.

DEFINITION

Unless otherwise specifically noted herein, the terms set forth below will have the following definitions.

As used herein, the term "binding medium" is not particularly limited and refers to any material that can provide sufficient adhesion between the various components (e.g., the piezoelectric material and the conductivity enhancer) in the composites described herein.

As used herein, the term "piezoelectric material" refers to any material that can produce a piezoelectric effect. In general, a piezoelectric material can generate electric charges when a mechanical stress (for example, pressure) is applied to the material. The electrical charge produced is generally proportional to the applied mechanical stress, changes sign between tensional or compressional stress, and determined by the piezoelectric coefficient. The piezoelectric effect can be reversible: an applied mechanical stress can generate a voltage and an applied voltage can change the shape of the material.

As used herein, the term "conductivity enhancer" refers to any material that can enhance the charge transfer capability of the piezoelectric material embedded within the composites described herein.

As used herein, the term "concrete or concrete-related substrate" refers to any substrate that is made up entirely of or partially of concrete. A concrete or concrete-related substrate can have various forms and/or shapes. In some embodiments, the concrete or concrete-related substrate is a structure that may be exposed to salt water. In some embodiments, the concrete or concrete-related substrate is a structure that may be exposed to acidic environment. Examples of concrete or concrete-related substrate include, but are not limited to bridges, bridge piling, tunnels, sea walls, retaining walls, docks, breakwater, pavement, ships, barges, roads, walkways, offshore platforms (e.g., oil rigs), pavements, and the like.

Corrosion-Resistant Composites

Some embodiments disclosed herein provide corrosion-resistant composites. In some embodiments, the corrosion-resistant composite include a piezoelectric material, a binding medium, and a conductivity enhancer.

Binding Medium

As described above, binding medium, in some embodiments, refers to material that provides sufficient adhesion between the various components (e.g., the piezoelectric material and the conductivity enhancer) in the composite. For example, the binder may sufficiently adhere the components to form a generally solid composite. In some embodiments, the binding medium, or its precursor, can allow the composite to flow until it is cured to adhere the components together into a solid. The binding medium can be, in some embodiments, configured such that the composite after curing exhibits a penetration resistance of at least 500 psi, at least 1000 psi, at least 2000 psi, at least 3000 psi, or at least 4000 psi. The penetration resistance can be readily determined according to ASTM C 403.

In some embodiments, the binding medium can include a binding polymer. For example, the binding polymer may be a thermoplastic or thermosetting polymer that can be initially a liquid before curing the material into a solid. The binding polymer can be cured by various means, such as by cross-linking an existing polymer or polymerizing monomer units (or lower molecular weight polymers). As one example, the binding medium can be an epoxy, where the precursor materials for the epoxy (e.g., bisphenol-A and epichlorohydrin) can be mixed with other components. The precursor materials can be polymerized to form the binding medium and harden the composite. As another example, the binding medium can be a photo-polymerizable polymer, such as an acrylic. Monomer units can be combined with other components in the composite and exposed to radiation to polymerize the monomers into an acrylic polymer. The acrylic forms the binding medium and adheres the components within the composite. It would be appreciated by skill artisans that many other possible polymers can be used as the binding medium and are within the scope of the present disclosure.

In some embodiments, the binding medium includes cement. As used herein, the term "cement" is intended to include its generally understood meaning for concrete materials (see ASTM C125-10A). The cement can be hydraulic cement or non-hydraulic cement. That is, the cement may or may not require hydrating with water in order to cure the binding medium. Portland cement, and its many related blends, is one example of cement that can be included in the composites of the present disclosure. In some embodiments, the cement is hydraulic cement.

The binding medium can also be a mixture of two or more components. For example, the binding medium can be a mixture of a binding polymer and cement (e.g., a mixture of epoxy and Portland cement). The binding medium can include, for example, at least about 20% by weight cement, at least about 30% by weight cement, at least about 50% by weight cement, at least about 70% by weight cement, at least about 80% by weight cement, at least about 90% by weight cement, or at least about 95% by weight cement. The binding medium can include, for example, at least about 10% by weight binding polymer, at least about 20% by weight binding polymer, at least about 30% by weight binding polymer, at least about 40% by weight binding polymer, at least about 50% by weight binding polymer, or at least about 80% by weight binding polymer.

The amount of binding medium in the composite is not particularly limited and will be selected based on the particular binding medium and other components in the composite. Thus, in some embodiments, the composite includes an amount of binding medium that is effective to form a solid composite (e.g., the composite does not flow under applied pressure). For example, the amount of binding medium can be an effective amount such that, after curing, the composite exhibits a penetration resistance of at least about 500 psi, at least about 1000 psi, at least about 2000 psi, at least about 3000 psi, or at least about 4000 psi.

The mass percent of the binding medium in the composite can vary. For example, the composite can contain the binding medium in a mass percent of about 1%, about 5%, about 10%, about 20%, about 30%, about 40%, about 50%, about 55%, about 60%, about 65%, about 70%, about 75%, about 80%, about 85%, about 90%, about 95%, or any range between two of these values, based on the total mass of the composite. In some embodiments, the composite has the binding medium in a mass percent of about 20% to about 50%, based on the total mass of the composite. In some embodiments, the composite contains the binding medium in a mass percent of about 30%, based on the total mass of the composite.

Piezoelectric Material

In addition to the binding medium, the corrosion-resistant composites disclosed herein can include a piezoelectric material. As described above, piezoelectric materials are materials that can produce a piezoelectric effect. The principle of piezoelectric effect is: when some dielectrics are subject to an outside force along a certain direction and are distorted, the dielectrics will become polarized insides, at the same time, positive and negative electrical charges will appear on the two opposite surfaces thereof. When the outside force disappears, the dielectrics will come back to the original uncharged state; whereas when the force direction is changed, the charge polarity will change along with it. Conversely, when an electric field is applied to polarization directions of dielectrics, the dielectrics will also distort. When the electric field is taken off, the dielectrics' distortion disappears. This phenomenon is referred to as converse piezoelectric effect or electrostriction effect phenomenon.

Many materials, both natural and synthetic, can produce piezoelectric effects. Examples of piezoelectric material include, but are not limited to, piezoelectric ceramics, for example, lead zirconate titanate ($Pb[Zr_xTi_{1-x}]O_3$ $0 \leq x \leq 1$, also known as PZT), barium titanate ($BaTiO_3$), lead titanate ($PbTiO_3$), potassium niobate ($KNbO_3$), lithium niobate ($LiNbO_3$), lithium tantalate ($LiTaO_3$), sodium tungstate ($Na_2WO_3$), $Ba_2NaNb_5O_5$, $Pb_2KNb_5O_{15}$, sodium niobate $NaNbO_3$, bismuth ferrite ($BiFeO_3$), sodium potassium niobate (NaKNb); piezoelectric crystals, for example, quartz ($SiO_2$), Berlinite ($AlPO_4$), cane sugar, Rochelle salt (potassium sodium tartrate), Topaz, tourmaline, Gallium orthophosphate ($GaPO_4$), Langasite ($La_3Ga_5SiO_{14}$); piezoelectric polymers, for example, polyvinylidene fluoride (PVDF); piezoelectric composites, for example a composite constructed from an array of parallel fibers of s piezoelectric material; and any combination thereof. Tourmaline is a class of crystal boron silicate minerals compounded with elements such as aluminum (Al), iron (Fe), magnesium (Mg), sodium (Na), lithium (Li) and potassium (K). The general formula of tourmaline is written as $XY_3Z_6(T_6O_{18})(BO_3)_3V_3W$, where:

X=Ca, Na, K, or a vacancy;
Y=Li, Mg, $Fe^{2+}$, Mn, Zn, Al, Cr, V, $Fe^{3+}$, Ti, or a vacancy;
Z=Al, Mg, $Fe^{3+}$, Cr, or V;
T=Si, Al, or B;
B=B or a vacancy;
V=OH or O
W=OH, F or O Examples of tourmaline include, but are not limited to, Buergerite ($NaFe^{3+}_3Al_6Si_6O_{18}(BO_3)_3O_3F$), Chromdravite ($NaMg_3Cr_6Si_6O_{18}(BO_3)_3(OH)_4$), Dravite ($NaMg_3Al_6Si_6O_{18}(BO_3)_3(OH)_4$), Elbaite ($Na(Li_{1.5},Al_{1.5})Al_6Si_6O_{18}(BO_3)_3(OH)_4$), Feruvite ($CaFe^{2+}_3(MgAl_5)Si_6O_{18}(BO_3)_3(OH)_4$), Foitite (($Fe^{2+}_2Al)Al_6Si_6O_{18}(BO_3)_3(OH)_4$), Liddicoatite ($Ca(Li_2Al)Al_6Si_6O_{18}(BO_3)_3(OH)_3F$), Magnesiofoitite (($Mg_2Al)Al_6Si_6O_{18}(BO_3)_3(OH)_4$), Olenite ($NaAl_3Al_6Si_6O_{18}(BO_3)_3O_3OH$), Povondraite ($NaFe^{3+}_3(Fe^{3+}_4Mg_2)Si_6O_{18}(BO_3)_3(OH)_3O$), Rossmanite (($LiAl_2)Al_6Si_6O_{18}(BO_3)_3(OH)_4$), Schorl ($NaFe^{2+}_3Al_6Si_6O_{18}(BO_3)_3(OH)_4$), Uvite ($CaMg_3(MgAl_5)Si_6O_{18}(BO_3)_3(OH)_3F$), and Vanadiumdravite ($NaMg_3V_6Si_6O_{18}(BO_3)_3(OH)_4$). In some embodiments, the tourmaline is $NaR_3Al_6(Si_6O_{18})(BO_3)_3(OH,F)_4$, where R=Mg, Fe, Mn, Li, or Al. In some embodiments, the tourmaline is Elbaite.

In some embodiments, the piezoelectric material is selected from tourmaline, lead zirconate titanate (PZT), quartz, and any combination thereof. In some embodiments, the piezoelectric material includes tourmaline. In some embodiments, the piezoelectric material includes Elbaite.

The mass percent of the piezoelectric material included the composite can vary. For example, the composite can contain the piezoelectric material in a mass percent of about 1%, about 5%, about 10%, about 20%, about 30%, about 40%, about 50%, about 55%, about 60%, about 65%, about 70%, about 75%, about 80%, about 85%, about 90%, about 95%, or any range between two of these values, based on the total mass of the composite. In some embodiments, the composite has the piezoelectric material in a mass percent of about 50% to about 70%, based on the total mass of the composite. In some embodiments, the composite contains the piezoelectric material in a mass percent of about 65%, based on the total mass of the composite.

The piezoelectric material can be dispersed within the binding medium; however, the present disclosure is not particularly limited in how the piezoelectric material is dispersed within the binding medium. In some embodiments, the piezoelectric material is randomly dispersed within the binding medium. Various embodiments are disclosed herein, but others will be readily apparent to the skilled artisans and are within the scope of the present disclosure.

In some embodiments, the piezoelectric material is granular (e.g., powder or particles). For example, as discussed herein, the piezoelectric material can be combined (e.g., intermixed) with the binding medium before curing. Thus, the piezoelectric material can be granular and dispersed within the binding medium. The particles of the granular piezoelectric material can have various sizes. For example, the average size of the piezoelectric material particles can be no more than about 1 mm, no more than about 500 µm, no more than about 100 µm, no more than about 50 µm, no more than about 10 µm, no more than about 1 µm, no more than about 500 nm, no more than about 100 nm, no more than about 50 nm, no more than about 10 nm, or less. In some embodiments, the average size of the particles of the piezoelectric material is no more than about $10^{-6}$ m. In some embodiments, the piezoelectric material includes tourmaline particles.

Conductivity Enhancer

In addition to the binding medium and the piezoelectric material, the corrosion-resistant composites disclosed herein can include a conductivity enhancer. As described above, conductivity enhancer can enhance the charge transfer capability of the piezoelectric material embedded within the composites. Examples of conductivity enhancer include, but are not limited to, carbon fiber materials such as graphite, carbon nanotubes, carbon black, acetylene black, carbon fiber, and mixture thereof; metals such as nickel, aluminum, copper, silver, and mixture thereof; and any combination thereof. In some embodiments, the conductivity enhancer is in powder form. In some embodiments, the conductivity enhancer is graphite.

The mechanism under which the conductivity enhancer functions to enhance the charge transfer capability of the piezoelectric material within the composites disclosed herein is not limited in any way. In some embodiments, a conductivity enhancer can contain electron channels to facilitate the movement of ions that have infiltrated into the composites. For example, graphite has a sandwich structure, wherein one carbon atom forms only 3 covalent bonds with other carbon atoms in the same layer and each carbon atom still holds one free electron to transfer charges. Without being limited to any particular theory, it is believed that the sandwich structure of graphite can allow fast movement of invaded ions, such as chloride ions, within its electron channels, and thus strengthen charge transfer capability of the piezoelectric material in the composite.

In some embodiments, the conductivity enhancer includes graphite particles. The graphite particles can be of various sizes. For example, the average size of the graphite particles can be no more than about 1 mm, no more than about 500 µm, no more than about 100 µm, no more than about 50 µm, no more than about 10 µm, no more than about 1 µm, no more than about 500 nm, no more than about 100 nm, no more than about 50 nm, no more than about 10 nm, or less. In some embodiments, the average size of the graphite particles is no more than about $10^{-6}$ m.

The mass percent of the conductivity enhancer in the composite can vary. For example, the composite can contain the conductivity enhancer in a mass percent of about 0.1%, about 0.5%, about 1%, about 2%, about 3%, about 4%, about 5%, about 6%, about 7%, about 8%, about 9%, about 10%, about 15%, about 20%, about 25%, or any range between two of these values, based on the total mass of the composite. In some embodiments, the composite contains the conductivity enhancer in a mass percent of about 1% to about 10%, based on the total mass of the composite. In some embodiments, the composite contains the conductivity enhancer in a mass percent of about 5%, based on the total mass of the composite.

As would be appreciated by the skilled artisans, the composites disclosed herein can include various other components without departing from the scope of the present disclosure. For example, the composites can also include other components intended to enhance the corrosion resistance of the composites, inert materials such as expanded slag, fillers, or porous regions. Thus, the various components described herein are not intended to be exhaustive and other, non-listed components are expressly permitted.

Some embodiments of the composites disclosed herein are directed to concrete. It is therefore within the scope of the present disclosure to include various other components in the composite that are commonly included in concrete. Non-limiting example of additional components include granular materials, viscosity modifiers, corrosion inhibitors, pigments, wetting agents, water-soluble polymers, strength enhancing agents, rheology modifying agents, water repellents, fibers, permeability reducers, pumping aids, fungicidal admixtures, germicidal admixtures, insecticidal admixtures, finely divided mineral admixtures, alkali reactivity reducer, bonding admixtures, and any other admixtures or components that do not adversely affect the corrosion-resistant properties of the composite. U.S. Pat. No. 7,670,426 discloses many common components in concrete, as well as basic procedures for preparing concrete.

In some embodiments, the composite can include a granular material dispersed within the binding medium. The granular material is not particularly limited and can be selected based upon the desired properties of the composite. In some embodiments, the granular material is configured to carry compressive loads. The granular material can therefore be any material with sufficient compressive strength. For example, the granular material can exhibit a compressive strength of at least about 1000 psi (about 7000 kPa), at least about 2000 psi (about 14,000 kPa), at least about 3000 psi (about 21,000 kPa), at least about 5000 psi (about 34,000 kPa), or at least about 6000 psi (about 41,000 kPa). The granular material can, in some embodiments, be selected from sand, sand-rock, gravel, stone, crushed stone, iron-blast furnace slag, and combinations thereof. In some embodiments, the granular material is aggregate. As used herein, the term "aggregate" is intended to include its generally understood meaning for concrete materials (see e.g., ASTM C125-10A).

Methods for Making Corrosion-Resistant Composites

Also disclosed herein are methods of making the corrosion-resistant composites. Some embodiments of the methods disclosed herein are advantageous because they can prepare the corrosion-resistant composites without specialized equipment(s) or technique(s) that may increase the costs of making the composites.

Figure 1:
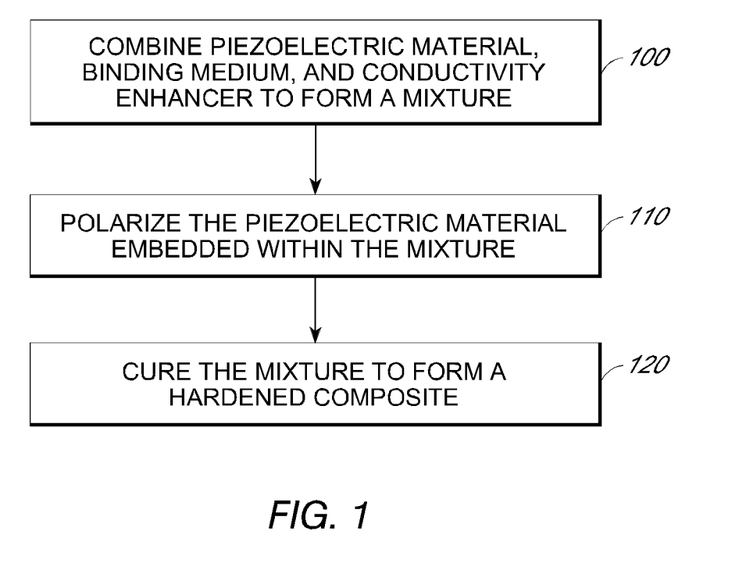
FIG. 1 depicts an illustrative embodiment of a method of making the corrosion-resistant composites within the scope of the present disclosure.

Some embodiments of the methods disclosed herein are depicted in FIG. 1. Beginning at block 100 (Combine piezoelectric material, binding medium, and conductivity enhancer to form a mixture), a binding medium, a piezoelectric material and a conductivity enhancer are combined to form a mixture. The binding medium, piezoelectric material and conductivity enhancer can be of any of those discussed above with respect to the composite. For example, the binding medium can be concrete, the piezoelectric material can be tourmaline, and the conductivity enhancer can be graphite. In some embodiments, the mixture is in the form of cement mortar. In some embodiments, the mixture has about 5% to about 30%, about 8% to about 25%, about 10% to 20%, or about 12% to about 15% conductivity enhancer (e.g., graphite) by weight. Other components can also be combined in block 100, such as water or any other the components discussed above with respect to the composite. In some embodiments, the binding medium, the piezoelectric material, the conductivity enhancer, and/or any of the other components included in the composites can be grinded (separately or together) before, during or after being combined to form a mixture in block 100. In some embodiments, the component is grinded by a jet mill. As would be appreciated by the skilled artisans, various grinding mediums can be used during the grinding process as long as the grinding medium does not react with the binding medium and the piezoelectric material. In some embodiments, the grinding medium contains at least about 99% ethanol.

In some embodiments, the binding medium, the piezoelectric material, the conductivity enhancer, and/or any of the other components included in the composites can be sieved (separately or together) before, during or after being combined to form a mixture in block 100. The components can be sieved using various sizes of sieve or mesh materials. For example, in some embodiments, the size of the sieve or mesh material can be 1.2 mm, 1 mm, 0.853 mm, 0.710 mm, 0.599 mm, 0.500 mm, 0.422 mm, 0.354 mm, 0.297 mm, 0.251 mm, 0.211 mm, 0.178 mm, 0.152 mm, 0.125 mm, 0.104 mm, 0.089 mm, 0.075 mm, 0.066 mm, 0.053 mm, 0.044 mm, 0.037 mm, or smaller. In some embodiments, the component(s) that passes through a standard sieve-325 mesh (i.e., a 0.044-mm sieve) is used in block 100. The components can be mixed together using, for example, a concrete mixer or a dispersion machine. In some embodiments, the components are combined to obtain a generally uniform mixture. In some embodiments, water is combined with the binding medium, the piezoelectric material, and the conductivity enhancer. The order of combining the components is not particularly limited and any order is within the scope of the present disclosure. Block 100 may be followed by block 110.

At block 110 (Polarize the piezoelectric material embedded within the mixture), the piezoelectric material embedded within the mixture is polarized. Polarizing the piezoelectric material can include applying an external electric field to the mixture. The method of applying the external electric field to the mixture is not limited in anyway. For example, metal wire nettings can be placed on the upper and lower surfaces of the mixture to allow application of the external electric field to the mixture. In some embodiments, the polarizing includes maintaining the mixture within a fixed region while the piezoelectric material is polarized. The fixed region can be a predetermined location where the mixture will be used (e.g., a portion of a concrete structure, such as a road or a breakwater, where the corrosion-resistant composite is used to form a protective coating for the concrete structure). In some embodiments, the fix region is on the surface of a portion of a concrete or concrete-related substrate where the mixture is cured to form a protective coating.

The strength of the external electric field can vary as long as it is sufficient to activate piezoelectricity of the piezoelectric material embedded within the material. Typically, the voltage of the external electric field is lower than the breakdown voltage of the binding medium. For example, the voltage of the external electric field can be no more than about 3000 V, no more than about 2500 V, no more than about 2000 V, no more than about 1500 V, no more than about 1000 V, no more than about 900 V, no more than about 800 V, no more than about 700 V, no more than about 600 V, no more than about 500 V, no more than about 400 V, no more than about 300 V, no more than about 250 V, no more than about 200 V, no more than about 150 V, no more than about 100 V. In some embodiments, the voltage of the external electric field is about 220 V. In some embodiments, the voltage of the external electric field is about 110 V.

In some embodiments, the strength of the external electric field is correlated with the time required for polarizing the piezoelectric material. In some embodiments, at least about 10%, at least about 20%, at least about 30%, at least about 40%, at least about 50%, at least about 60%, at least about 70%, at least about 80%, at least about 85%, at least about 90%, at least about 95%, at least about 99% of the piezoelectric material embedded within the composites disclosed herein are polarized after the external electric field is applied to the composite for no more than about 1 minute, no more than about 5 minutes, no more than about 10 minutes, no more than about 15 minutes, no more than about 20 minutes, no more than about 25 minutes, no more than about 30 minutes, no more than about 45 minutes, no more than about 1 hour, no more than about 1.5 hours, or no more than about 2 hours. In some embodiments, the external electric field is applied to the mixture for no more than about 30 minutes. Block 110 may be followed by block 120.

At block 120 (Cure the mixture to form a hardened composite), the mixture is cured to form a hardened composite. Curing the mixture can include maintaining the mixture under conditions sufficient for the mixture to harden (i.e., the mixture does not flow under applied pressure). The method of curing can vary depending, in part, upon the binding medium in the mixture. For example, if the binding medium includes hydraulic cement, the curing may include maintaining the mixture under moist conditions so that the mixture sufficiently hardens. This can be achieved, for example, by covering the mixture with a plastic sheet, or applying water to the mixture. Meanwhile, if the binding medium includes a polymer, curing can include exposing the mixture to radiation to initiate cross-linking or polymerization. In some embodiments, the curing includes maintaining the mixture within a fixed region while the mixture hardens. The fixed region can be a predetermined location where the corrosion-resistant composite will be used.

It would be appreciated by skilled artisans that the order in which the polarizing (block 110) and the curing (block 120) occur is not particularly limited. The polarizing and the curing can occur concurrently or sequentially, and any order is within the scope of the present disclosure. In some embodiments, the piezoelectric material can be polarized before the mixture is cured to form a hardened composite. In some embodiments, the piezoelectric material can be polarized when the mixture is being cured to form a hardened composite. In some embodiments, the piezoelectric material can be polarized after the mixture has been cured to form a hardened composite.

Methods for Protecting Concrete from Corrosion

Figure 2:
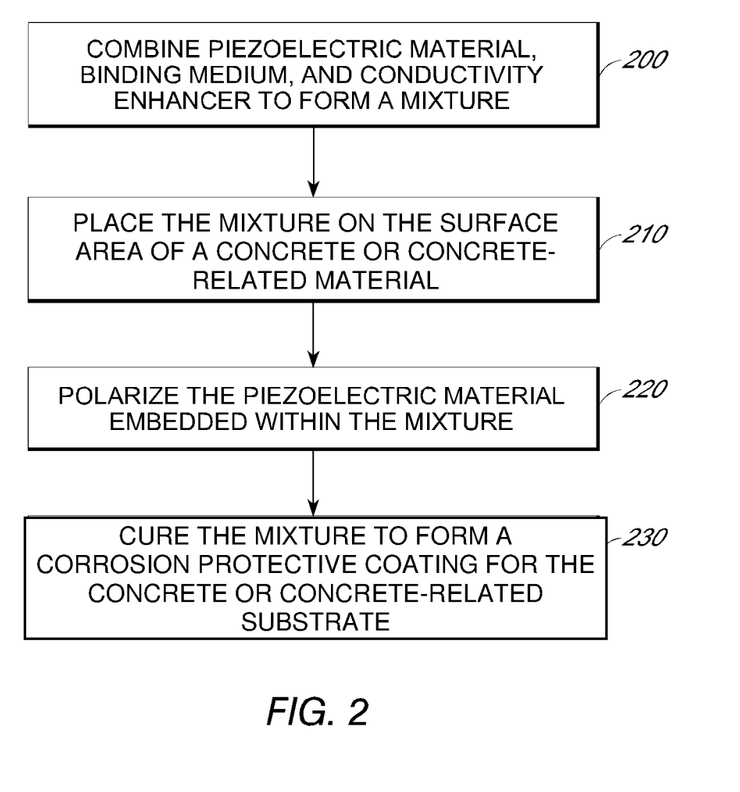
FIG. 2 depicts an illustrative embodiment of a method of protecting a concrete or concrete-related substrate from corrosion within the scope of the present disclosure.

Also disclosed herein are methods of protecting concrete or concrete-related structures from corrosion using the corrosion-resistant composites disclosed herein. An illustrative embodiment of the methods is depicted in FIG. 2.

Beginning at block 200 (Combine piezoelectric material, binding medium, and conductivity enhancer to form a mixture), a binding medium, a piezoelectric material, and a conductivity enhancer are combined to form a mixture. As described above with regard to block 100, the binding medium, piezoelectric material and conductivity enhancer can be of any of those discussed above with respect to the composite. The mixing (block 200) can be conducted according to the general procedure described above with regard to block 100.

At block 210 (Place the mixture on the surface area of a concrete or concrete-related material), the mixture is placed on the surface area of a concrete or concrete-related substrate. In some embodiments, the mixture can be poured over the concrete or concrete-related substrate so that the concrete or concrete-related substrate is at least partially covered by the mixture. Block 200 may be followed by block 210.

At block 220 (Polarize the piezoelectric material embedded within the mixture), the piezoelectric material embedded within the mixture is polarized. As described above with regard to block 110, polarizing the piezoelectric material can include applying an external electric field to the mixture. The polarizing (block 220) can be conducted according to the general procedure described above with regard to block 110. Block 210 may be followed by block 220.

Block 230 (Cure the mixture to form corrosion protective coating for the concrete or concrete-related substrate) includes curing the mixture to form a corrosion protective coating for the concrete or concrete-related substrate. As described above with regard to block 120, curing the mixture can include maintaining the mixture under conditions sufficient for the mixture to harden (i.e., the mixture does not flow under applied pressure). The curing (block 230) can be conducted according to the general procedure described above for block 120. Block 220 may be followed by block 230.

It would be appreciated by skilled artisans that the order in which the polarizing (block 220) and the curing (block 230) occur is not particularly limited. The polarizing and the curing can occur concurrently or sequentially, and any order is within the scope of the present disclosure. In some embodiments, the piezoelectric material can be polarized before the mixture is cured to form the corrosion protective coating. In some embodiments, the piezoelectric material can be polarized while the mixture is being cured to form the corrosion protective coating. In some embodiments, the piezoelectric material can be polarized after the mixture has been cured to form the corrosion protective coating.

Without being limited to any particular theory, it is believed that polarization of the piezoelectric material can produce a piezoelectric field within the protective coating, and thus upon application of an external force (e.g., hydraulic pressure), positive and negative electrical charges will appear on the two opposite surfaces of the protective coating to prevent entry of certain salts or acids to the protective coating, and/or to bring certain salts or acids to the surface of the protective coating for releasing. As a result, the composites disclosed herein can effectively and durably prevent concrete (including the reinforcing steel bars in the concrete) from corrosion caused by salts or acids. In some embodiments, the concrete or concrete-related substrate is protected from corrosion caused by salt or acid. In some embodiments, the acid is carbonic acid. In some embodiments, the concrete or concrete-related substrate is protected from corrosion caused by ions selected from the group consisting of $Cl^-$, $SO_4^{2-}$, and $H^+$.

The composites disclosed herein can be particularly advantageous in structures that may be exposed to salt water, for example, structures near coastal areas. Non-limiting examples of structures that can include the composites disclosed herein include bridges, bridge piling, tunnels, sea walls, retaining walls, docks, breakwater, pavement, ships, barges, roads, walkways, offshore platforms (e.g., oil rigs), and the like.

EXAMPLES

Additional embodiments are disclosed in further detail in the following examples, which are not in any way intended to limit the scope of the claims.

Example 1

Preparation of Corrosion-Resistant Cement

Tourmaline powder, artificial graphite powder, and 32.5 grade ordinary silicate cement are placed separately in globe mill and grind in absolute ethanol (as grinding medium). The ground powders of tourmaline, graphite and cement are dried and sieved through the standard sieve-325 mesh, respectively. The powders that pass through the mesh are collected. The sieved tourmaline, graphite and cement powder are mixed with the addition of a small amount of ethanol to form a mixture, where the mixture contains tourmaline powder, graphite powder, and cement powder in a mass percent of about 65%, about 5%, and about 30%, respectively, based on the total mass of the mixture. The mixture is placed in ultrasonic material dispersion machine for dispersion for 1 hour, and then agitated continuously while drying until the ethanol evaporates completely.

Example 2

Protection of Breakwater from Chloride Ion Corrosion

Figure 3:
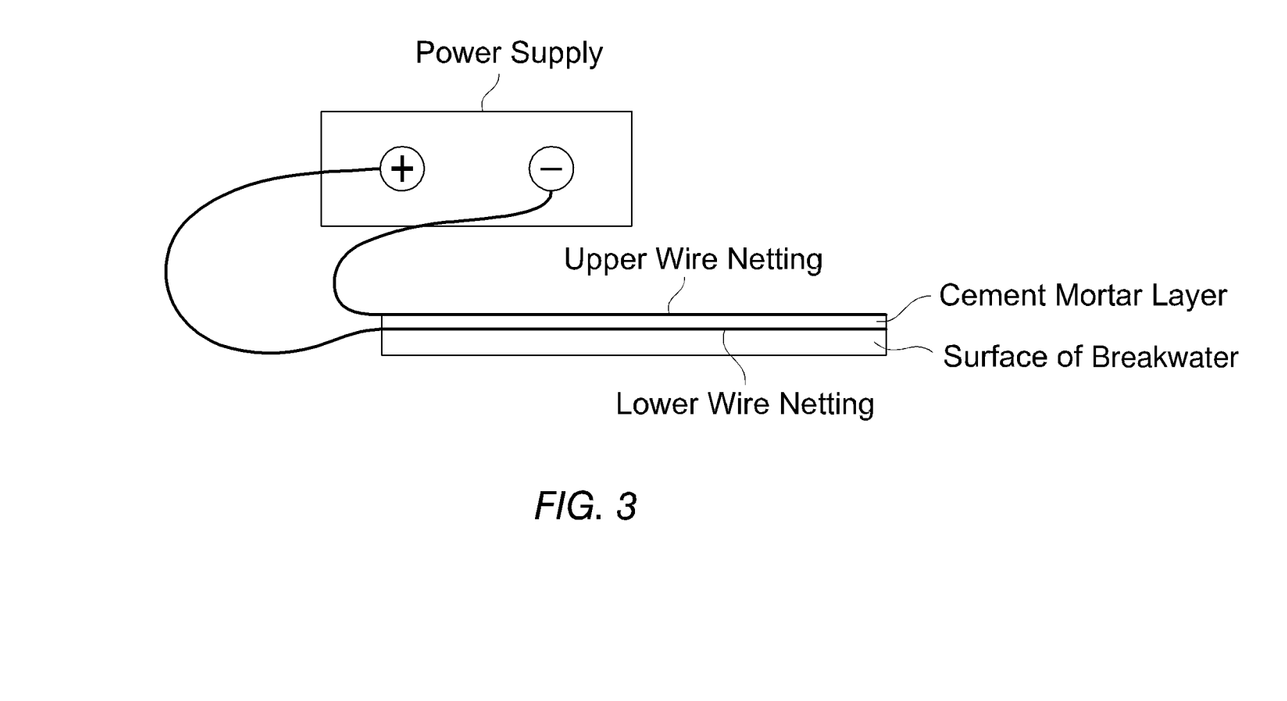
FIG. 3 is a schematic diagram illustrating an embodiment of the polarization process of the piezoelectric material embedded within the corrosion protective coating for a concrete or concrete-related substrate within the scope of the present disclosure.

Corrosion-resistant cement is prepared according to the general procedure described in Example 1. The cement is mixed with gravel and water to form a cement mortar. The cement mortar is poured on the surface of a breakwater. As illustrated in FIG. 3, a fine wire netting is laid on the surface of a breakwater, and the cement mortar is poured over the fine wire netting to form a cement mortar layer. A second fine wire netting is then laid on the upper surface of the cement mortar layer. Each of the wire nettings has at least one wire extending about 5 cm outside the cement mortar to allow connection with an external power supply. A voltage of 220 V is applied between the lower and upper wire netting layers by the power supply for about 20 to about 60 minutes. The cement mortar is cured to form a corrosion protective coating on the surface of the breakwater.

Figure 4A:
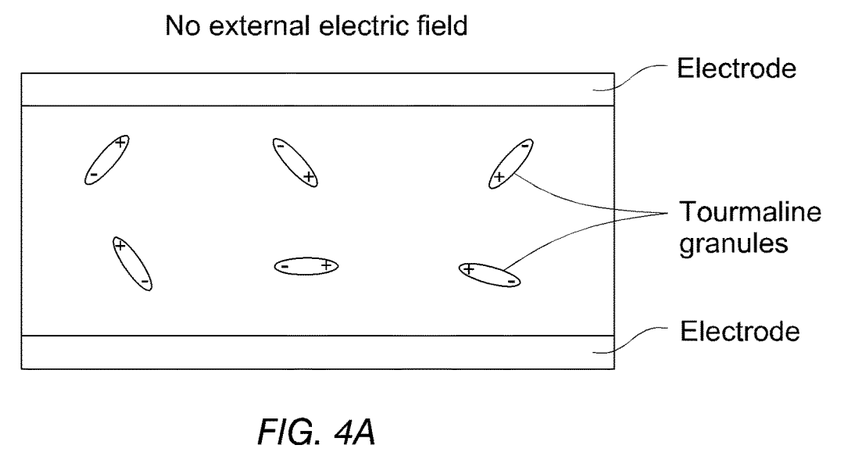
FIG. 4A shows the corrosion protective coating before the application of an external electric field.
Figure 4B:
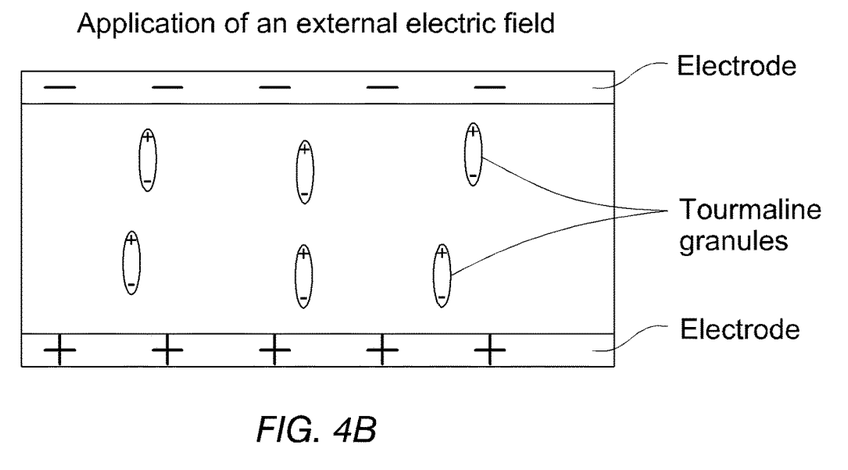
FIG. 4B shows the corrosion protective coating when the external electric field is being applied.
Figure 4C:
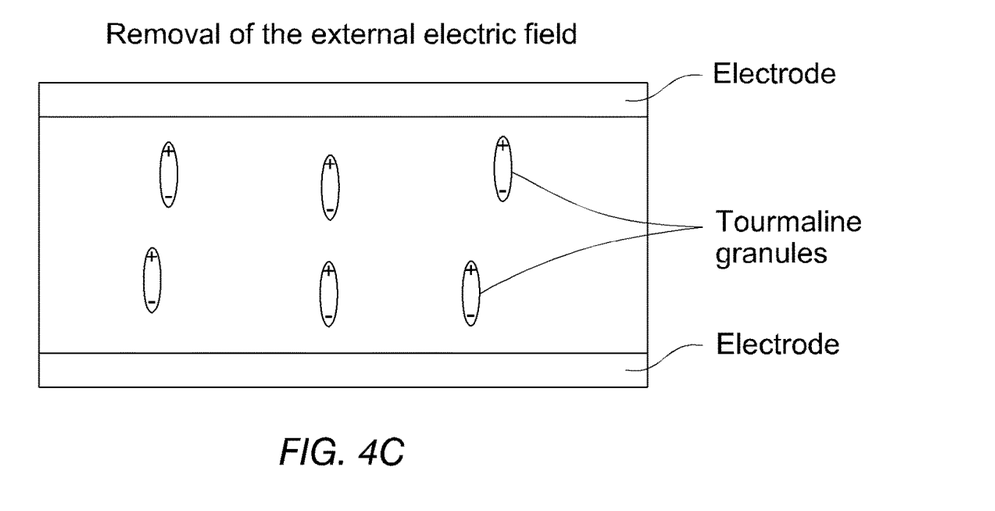
FIG. 4C shows the corrosion protective coating after removal of the external electric field and polarization of tourmaline granules.
Figure 4D:
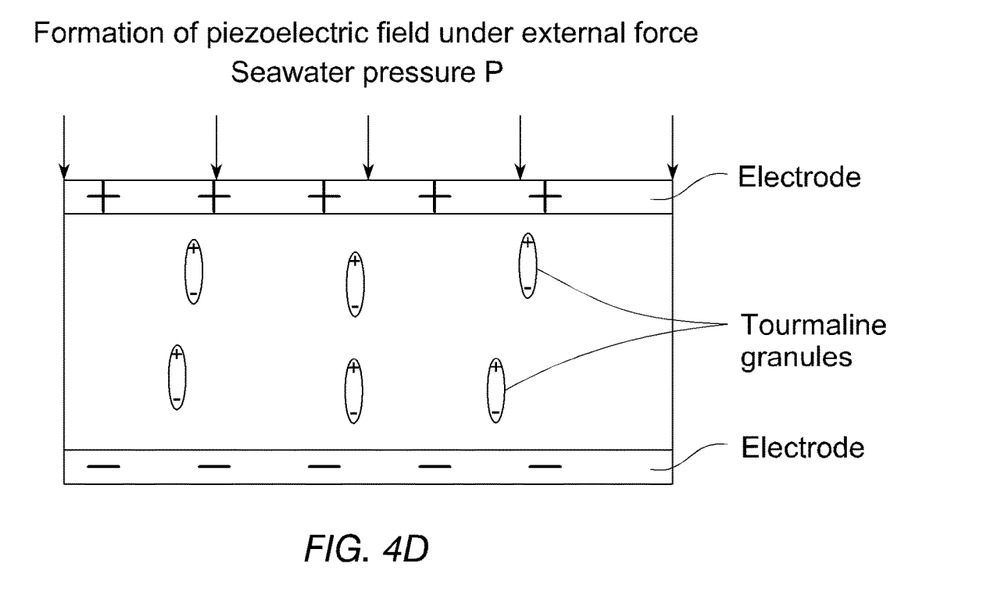
FIG. 4D shows the formation of a piezoelectric field under an external pressure.
Figure 4E:
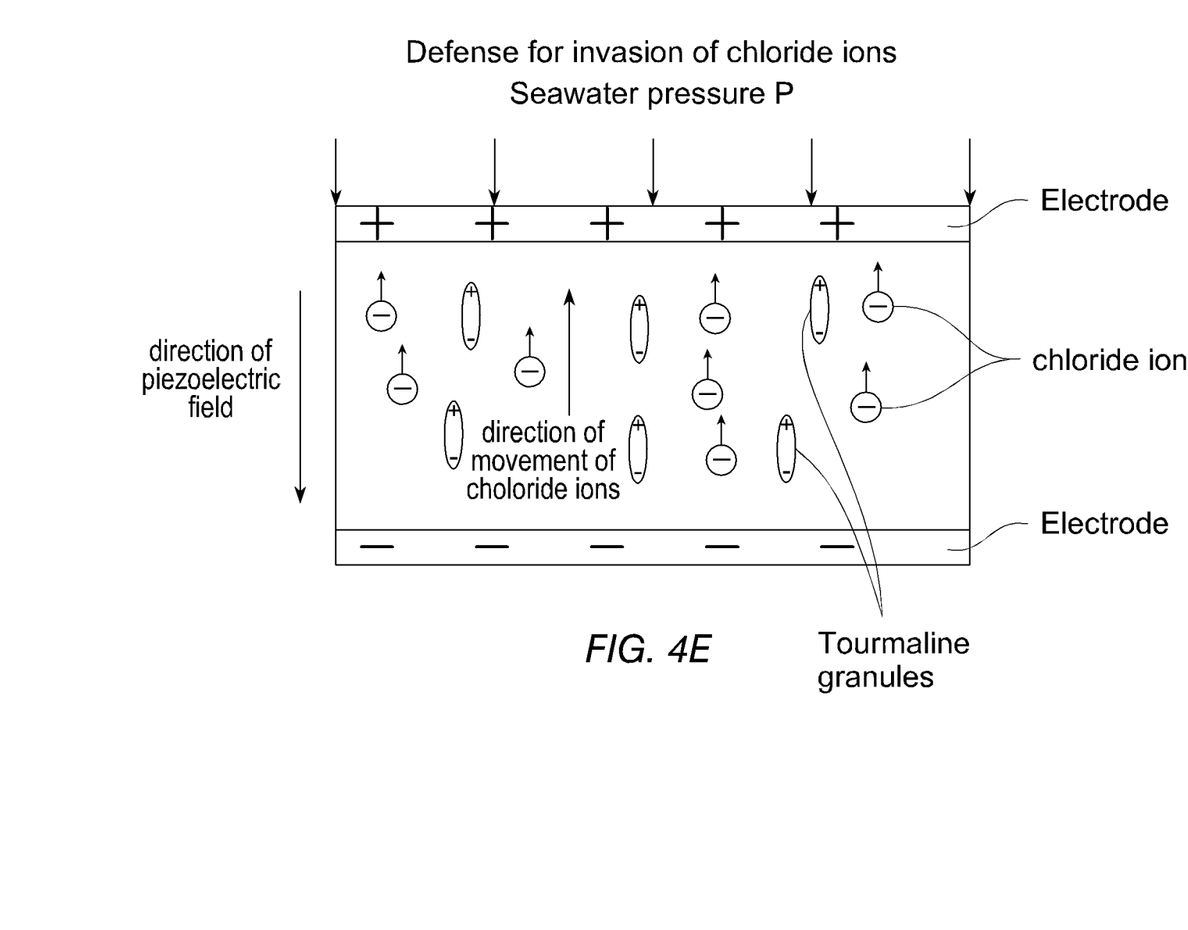
FIG. 4E shows the releasing of chloride ions from the corrosion protective coating in the piezoelectric field.

FIG. 4 schematically illustrates an exemplary mechanism under which the corrosion-resistant cement described in this example functions to protect the breakwater from chloride ion permeation. Before an external electric field is applied to the corrosion protective coating (i.e., the cement mortar layer), the tourmaline granules are randomly dispersed within the cement mortar layer (FIG. 4A) and there is no electric charge on the surface of the cement mortar layer. When an external electric field is being applied to cement mortar layer, negative electrical charges appear on the upper of the cement mortar layer, and positive electric charges appear on the lower surface of the cement mortar layer in accordance to the direction of the external electric field. At the same time, the tourmaline granules polarize within the cement mortar layer and form parallel arrays (FIG. 4B). After the removal of the external electric field, the electrical charges on the surfaces of the cement mortar layer disappear, and the tourmaline granules remain to line up along with the external electric field because of self-polarization (FIG. 4C). As shown in FIG. 4D, when the cement mortar layer is subjected to an external mechanical force (e.g., seawater pressure), tourmaline granules produces a piezoelectric field that has a direction opposite to the previously applied external electric field, and positive and negative electrical charges appear respectively on the upper and lower surface of the cement mortar layer. Under seawater pressure, the voltage computing formula of piezoelectric effect of tourmaline granule surface embedded within the cement mortar layer is expected as follows:

$$V = \frac{\rho(v^2 + gh)}{E_m} E$$

where
ρ=density of seawater,
v=velocity of seawater,
h=seawater depth under pressure;
g=acceleration of gravity
$E_m$=elasticity modulus of cement mortar
E=electrical field strength of tourmaline granule surface As shown in FIG. 4E, under the piezoelectric field, negative ions, such as chloride ions, which have permeated into the cement mortar layer, are forced to move toward the upper surface of the cement mortar layer for releasing from the mortar layer. Without being limited to any particular theory, it is believed that the releasing of chloride ions from the cement mortar layer can be facilitated by the electron channels within graphite. In addition, negative ions, such as chloride ions, are prevented from passing through the cement mortar layer and permeating into the breakwater because of the negative charges carried on the lower surface of the cement mortar layer. Therefore, it is expected that the corrosion-resistant cement described in this example can protect the breakwater from chloride ion permeation.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A corrosion-resistant composition, comprising:
a concrete or a concrete-related substrate; and
a corrosion-resistant composite comprising a piezoelectric material, a binding medium that includes cement, and a conductivity enhancer,
wherein the corrosion-resistant composite is located only on a surface of the concrete or concrete-related substrate.

2. The corrosion-resistant composition of claim 1, wherein the piezoelectric material is selected from the group consisting of a piezoelectric ceramic, a piezoelectric polymer, a piezoelectric crystal, a piezoelectric composite, and any combination thereof.

3. The corrosion-resistant composition of claim 1, wherein the piezoelectric material is selected from the group consisting of tourmaline, lead zirconate titanate (PZT), quartz, and any combination thereof.

4. The corrosion-resistant composition of claim 1, wherein the conductivity enhancer comprises graphite particles.

5. The corrosion-resistant composition of claim 1, wherein the corrosion-resistant composite contains the conductivity enhancer in a mass percent of about 5%, based on the total mass of the corrosion-resistant composite.

6. The corrosion-resistant composition of claim 1, wherein the conductivity enhancer is selected from the group consisting of carbon fiber materials, metals, and any combination thereof.

7. The corrosion-resistant composition of claim 1, wherein the corrosion-resistant composite contains the conductivity enhancer in a mass percent of about 3% to about 10%, based on the total mass of the corrosion-resistant composite.

8. The corrosion-resistant composition of claim 1, wherein the concrete or concrete-related substrate is at least partially covered by the corrosion-resistant composite.

9. A method of protecting a concrete or concrete-related substrate from corrosion, the method comprising:
combining a piezoelectric material, a binding medium that includes cement, and a conductivity enhancer to form a mixture;
placing the mixture on only a surface of the concrete or concrete-related substrate;
polarizing the piezoelectric material embedded within the mixture; and
curing the mixture to form a corrosion protective coating on the concrete or concrete-related substrate.

10. The method of claim 9, wherein the method further comprises applying external pressure on the protective coating to trigger polarization of the piezoelectric material embedded within the protective coating.

11. The method of claim 9, wherein the piezoelectric material comprises tourmaline particles.

12. The method of claim 9, wherein the conductivity enhancer comprises graphite.

13. The method of claim 9, wherein the concrete or concrete-related substrate is protected from corrosion caused by salt or acid.

14. The method of claim 13, wherein the concrete or concrete-related substrate is protected from corrosion caused by ions selected from the group consisting of $Cl^-$, $SO_4^{2-}$, and $H^+$.

15. The method of claim 14, wherein the concrete or concrete-related substrate is protected from corrosion caused by carbonic acid.

16. The method of claim 9, wherein the piezoelectric material is selected from the group consisting of a piezoelectric ceramic, a piezoelectric crystal, a piezoelectric polymer, a piezoelectric composite, and any combination thereof.

17. The method of claim 9, wherein the piezoelectric material is selected from the group consisting of tourmaline, lead zirconate titanate (PZT), quartz, and any combination thereof.

18. The method of claim 9, wherein the mixture has the piezoelectric material in a mass percent of about 50% to about 70%, based on the total mass of the mixture.

19. The method of claim 9, wherein the mixture contains the conductivity enhancer in a mass percent of about 1% to about 10%, based on the total mass of the mixture.

20. The method of claim 9, wherein the mixture contains the binding medium in a mass percent of about 20% to about 50%, based on the total mass of the mixture.

21. The method of claim 9, wherein the conductivity enhancer is selected from the group consisting of carbon fiber materials, metals, or any combination thereof.

22. The method of claim 9, wherein the combining comprises grinding the piezoelectric material, the binding medium, and/or the conductivity enhancer in a grinding medium.

23. The method of claim 22, wherein the grinding medium contains at least about 99% ethanol by volume.

24. The method of claim 9, wherein the polarizing comprises applying an external electric field to the mixture.

* * * * *